United States Patent
Seibert

(10) Patent No.: US 11,219,934 B2
(45) Date of Patent: Jan. 11, 2022

(54) BENDING MACHINE, MACHINING LINE AND METHOD FOR BENDING

(71) Applicant: Bystronic Laser AG, Niederönz (CH)

(72) Inventor: Friedemann Seibert, Winterbach/Pfalz (DE)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 17/291,220

(22) PCT Filed: Nov. 28, 2019

(86) PCT No.: PCT/EP2019/082841
§ 371 (c)(1),
(2) Date: May 4, 2021

(87) PCT Pub. No.: WO2020/126380
PCT Pub. Date: Jun. 25, 2020

(65) Prior Publication Data
US 2021/0308732 A1    Oct. 7, 2021

(30) Foreign Application Priority Data

Dec. 21, 2018 (DE) .......................... 102018133551.2

(51) Int. Cl.
*B21D 5/00* (2006.01)
*G05B 19/404* (2006.01)

(52) U.S. Cl.
CPC ........... *B21D 5/004* (2013.01); *G05B 19/404* (2013.01); *G05B 2219/36203* (2013.01)

(58) Field of Classification Search
None
See application file for complete search history.

(56) References Cited

U.S. PATENT DOCUMENTS

| | | | |
|---|---|---|---|
| 5,987,958 A * | 11/1999 | Moore, Jr. | ........... B23Q 15/225 |
| | | | 72/422 |
| 7,130,714 B1 * | 10/2006 | Kulkarni | ................ B21D 22/10 |
| | | | 700/165 |
| 2020/0128710 A1 * | 4/2020 | Iisaka | ................ H05K 13/0882 |

FOREIGN PATENT DOCUMENTS

| JP | H06-079357 A | 3/1994 |
|---|---|---|
| JP | H11-197748 A | 7/1999 |
| JP | 2000-317526 A | 11/2000 |

OTHER PUBLICATIONS

International Preliminary Report on Patentability, dated Mar. 23, 2021, from PCT/EP2019/082841 filed Nov. 28, 2019.

(Continued)

*Primary Examiner* — Sean Shechtman
(74) *Attorney, Agent, or Firm* — Workman Nydegger

(57) ABSTRACT

The invention relates to a bending machine (100) configured to bend a metallic workpiece (200), having a controller (130) configured to control a bending operation, wherein the controller (130) has at least one interface (340) configured to obtain information about a time-dependent springback of the workpiece (200) to be bent and to obtain a time indication of a subsequent further machining of the workpiece (200) to be bent, wherein the controller (130) is configured to calculate an adapted bending angle ($\alpha$) based on the springback and the time indication, and wherein the bending machine (100) is configured to bend the bending operation beyond a bending angle ($\beta$) to be bent up to the adapted bending angle ($\alpha$). Due to the adapted bending angle, the workpiece (300) has the correct bending angle ($\beta$) to be bent at the time of subsequent further machining.

9 Claims, 3 Drawing Sheets

(56) References Cited

OTHER PUBLICATIONS

International Search Report and Written Opinion, dated Mar. 4, 2020, from PCT/EP2019/082841 filed Nov. 28, 2019.

* cited by examiner

BENDING MACHINE, MACHINING LINE AND METHOD FOR BENDING

The invention relates to a bending machine configured to bend a metallic workpiece, a machining line adapted for machining a metallic workpiece with a bending machine, and a method for bending a metallic workpiece. In particular, the invention relates to a bending machine according to claim 1, a machining line according to claim 4, and a method for bending according to claim 6.

A machine tool is used to manufacture and machine workpieces using tools. For example, sheet metal working machines, in particular bending machines or presses such as press brakes are considered to be machine tools here.

Several methods for producing a desired bending angle are known and the inherent springback of the material during or immediately after the bending operation can also be compensated.

The aim of the invention is to avoid the disadvantages of the prior art and to provide an improved bending machine such as a press brake or a panel bending machine. Alternative objects are to provide an improved machining line or an improved method for bending.

This aim is achieved by a bending machine according to claim 1, a machining line according to claim 4, and a method for bending according to claim 6.

The bending machine according to the invention is configured to bend a metallic workpiece, with a controller configured to control a bending operation, wherein the controller has at least one interface to acquire information about a time-dependent springback of the workpiece to be bent and a time indication for subsequent further machining of the workpiece to be bent, wherein the controller is configured to calculate an adapted bending angle based on the springback and the time indication, and wherein the bending machine is configured to bend the bending operation beyond a bending angle to be bent to the adapted bending angle such that the workpiece is sprung back to the bending angle to be bent at the time of subsequent machining. Due to the adapted bending angle, the workpiece has the correct bending angle to be bent at the time of subsequent further machining.

The bending machine according to the invention takes into account that the bending angle reached after the bending operation, for example, depending on the bending speed and material, undergoes an additional provision during storage of the part after the completed bending operation. Thus, if the bent part is not further machined directly after the bending operation, the future deviation of the bending angle is calculated on the basis of a time indication of subsequent further machining, such as a time or a time duration, and taken into account accordingly in the bending operation. The workpiece is bent further, i.e. overbent, to compensate for the storage time. This overbending can be used for both free bending and stamping bending. If necessary, during stamping bending the die and/or the stamp must be adjusted accordingly.

The workpiece may be, for example, a flat metal sheet or a workpiece already preprocessed from a flat metal sheet. The interface may comprise one or more internal and external interfaces. The information about a time-dependent springback of the workpiece to be bent may be stored, for example in a database, or may be based on a measurement of, for example, a reference or test bend. Based on the measurement, the time-dependent springback can then be calculated or estimated.

The bending machine according to the invention has the advantage that a consideration of the time-dependent stress relief, i.e. a springback, occurs during storage until the time of further machining and thereby a tailor-made machining, for example, an automatic welding is possible.

It can be provided that the bending machine comprises a database with information regarding the time-dependent springback depending on at least one of the parameters of time, material, material thickness, bending speed, and machining already carried out. For example, the database or table may be created empirically by measurements. Alternatively or additionally, the table may be arranged in a higher-level control, such as a system or production control. A database allows a faster calculation of the bending curve or the bending angle in production.

It can further be provided that the bending machine has a sensor configured to capture the bending angle and that the controller is configured by the correction values detected by the sensor for the calculation of the adapted bending angle to use. In this way, the accuracy can also be increased for a staggered further machining.

A machining line according to the invention is arranged to machine a metallic workpiece with a bending machine as described above, a downstream machine tool for further machining the workpiece, and a production controller, wherein the production controller has at least one interface, arranged for the transmission of information about a time indication of subsequent further machining of the workpiece to be bent on the machine tool to an interface of the bending machine. The same advantages and modifications apply as described above. The production control system plans and controls the machining of the workpieces in the machining line and thus knows at what time which workpiece will be processed subsequently, i.e. after the bending operation. Accordingly, a time indication of a subsequent further machining of the workpiece to be bent prior to the bending operation is created.

It can be provided that a store is configured for storage and springback of the workpiece until further machining in the machine tool is provided. The workpiece is stored in the store so that a springback of the workpiece is made possible, i.e., there are no stops or components preventing this.

A method according to the invention for bending a metallic workpiece in a bending machine comprises the steps of:
capturing information about a time-dependent springback of the workpiece to be bent;
capturing a time indication of subsequent further machining of the workpiece to be bent;
calculating an adapted bending angle based on the springback and the time indication; and
bending the workpiece over a bending angle to be bent to the adapted bending angle. Due to the adapted bending angle, the workpiece has the correct bending angle to be bent at the time of subsequent further machining. The same advantages and modifications apply as described above.

It can be provided that, after the bending operation, the workpiece is stored in a store for storage and springback of the workpiece until further machining. The workpiece is stored in the store so that a springback of the workpiece is made possible, i.e., there are no stops or components preventing this.

It may further be provided that the calculation is carried out in a controller of a bending machine and/or a production controller of a machining line. The above-mentioned controllers are already available and the necessary data is available there.

It can be provided that the adapted bending angle is calculated such that an immediate springback of the workpiece immediately after the bending operation and a future springback of the workpiece are taken into account until further machining. Thus, the immediate springback and the future springback related to the time of bending are taken into account and compensated. Thus, the bending angle of the workpiece is optimised in terms of time until the next machining step.

Further preferred embodiments of the invention will become apparent from the remaining features mentioned in the dependent claims.

The various embodiments of the invention mentioned in this application can, unless otherwise stated in individual cases, be advantageously combined with one another.

The invention will be explained below in exemplary embodiments with reference to the accompanying drawings. In the figures.

Figure 1:
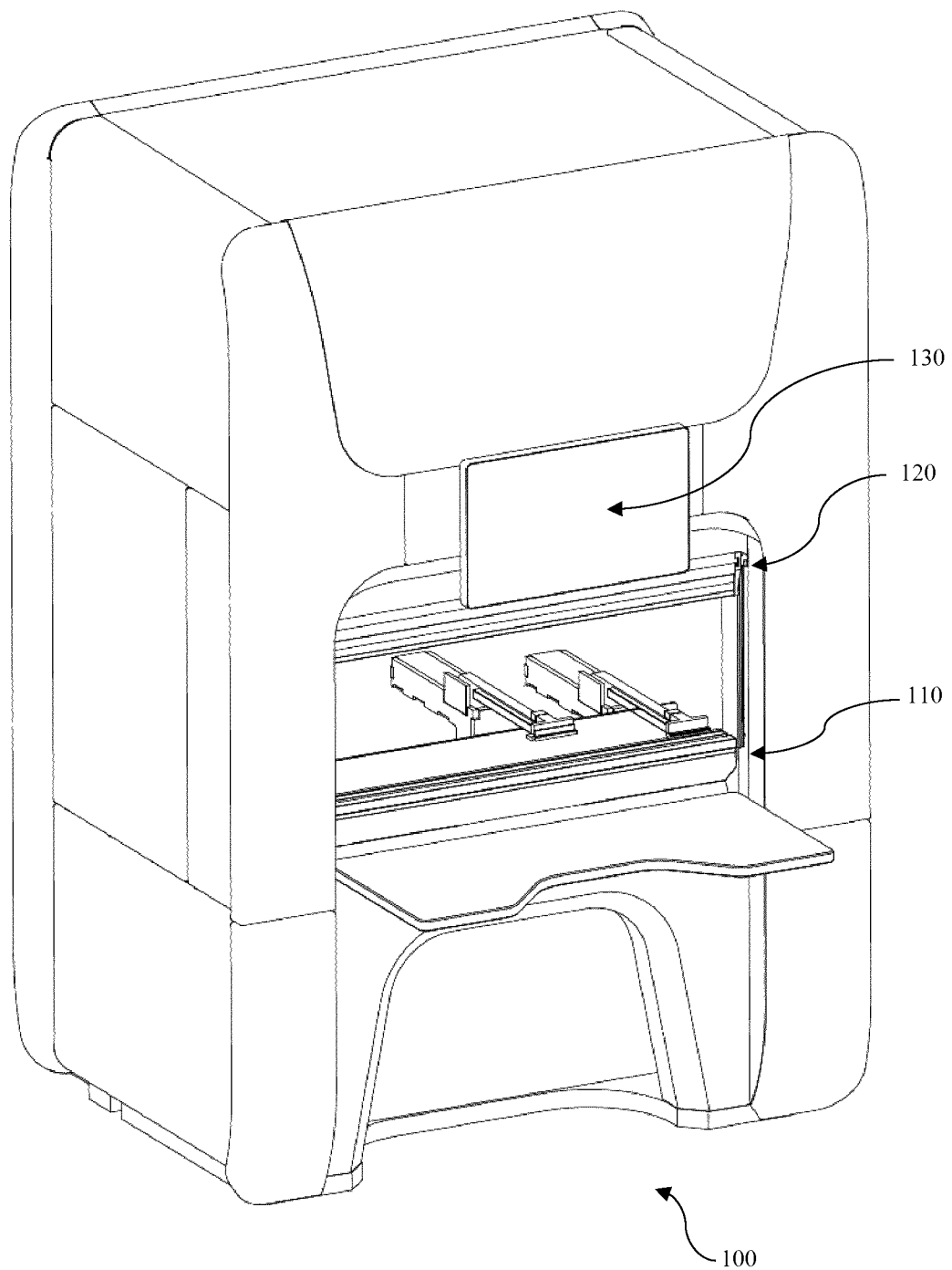
FIG. 1 shows a schematic perspective view of a bending machine.

FIG. 1 shows a schematic perspective view of a bending machine 100. The bending machine 100 is used for the production and machining of workpieces using tools, here in the form of a die 110 and a punch 120.

In a press brake, a punch or an upper tool 120 presses a metal sheet into a die or a lower tool 110, which determines the bending angle. Usually the lower tool 110 has a V-shaped opening and the upper tool 120 has a wedge or a tip. A workpiece such as a metal sheet is placed between the two tools 120 and 110. If the bending punch is lowered with a certain force, the workpiece is pressed into the opening of the lower tool 110 and bent to the required angle.

The bending machine 100 further comprises a controller 130 which controls the bending operation. In particular, the controller 130 calculates a bending curve or a bending angle for the workpiece to be bent. In addition, the controller 130 controls parameters of the bending operation such as the depth of insertion of the upper tool 120 into the lower tool 110, the insertion speed, and/or the insertion time.

Figure 2:
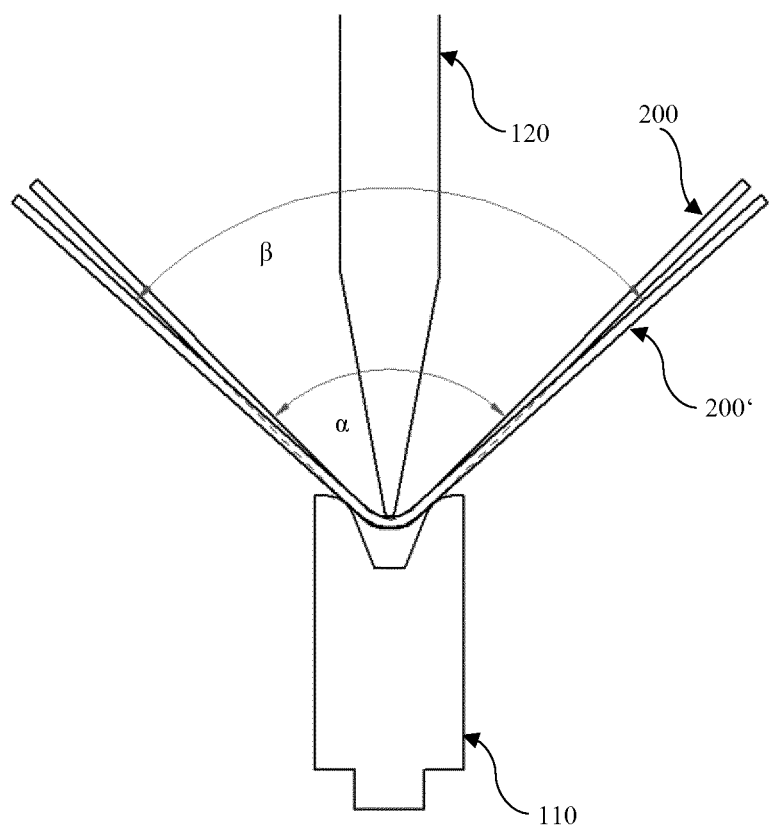
FIG. 2 shows a side sectional view of a bending operation in the bending machine.

FIG. 2 shows a side sectional view of a bending operation in the bending machine. A workpiece 200 to be machined, which initially rests on the lower tool 110, is pressed by the upper tool 120 into the lower tool. Thus, the workpiece 200 is bent to an adapted bending angle $\alpha$.

This adapted bending angle $\alpha$ is smaller than the actual bending angle $\beta$ to be bent. This means that the upper tool 120 is inserted deeper than necessary for the bending angle $\beta$ to be bent. The workpiece 200 is bent over taking into account the time-dependent stress relief until the time of further machining of the workpiece 200'. The workpiece 200' presents the workpiece at the angle $\beta$ of the springback material, i.e. at the time of further machining.

The difference between the adapted bending angle $\alpha$ and the actual bending angle $\beta$ to be bent can be referred to as the overbending angle. This overbending angle, i.e. the proportion of the adapted bending angle $\alpha$ which extends beyond the bending angle $\beta$ to be bent, can range from 0.1° to approximately 6°, preferably from 2° to 3°. The adapted bending angle $\alpha$ or the overbending angle depends on the time-dependent springback or on at least one of the parameters of time, material, material thickness, bending speed, and machining already carried out. In the following, the calculation of the adapted bending angle $\alpha$ will be described.

Figure 3:
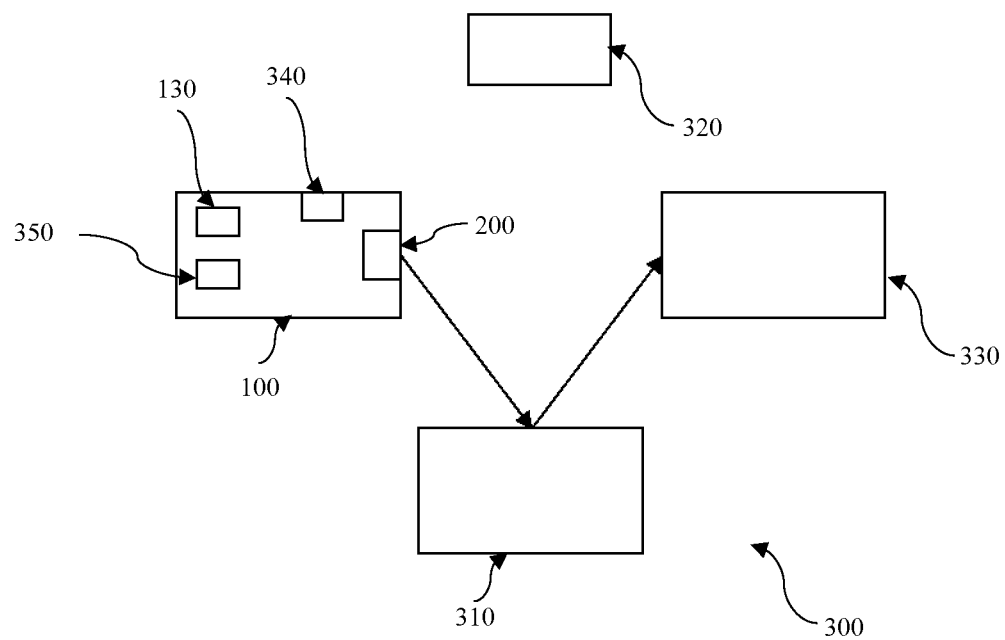
FIG. 3 shows a schematic view of a machining line with the bending machine.

FIG. 3 shows a schematic view of a machining line 300 with the bending machine 100. After the bending machine 100 has machined a workpiece 200, it is automatically or manually transferred to an intermediate store or store 310. From the store, the workpiece 200 is automatically or manually fed to a machine tool 330 in accordance with a production plan created and controlled by a production controller 320. The machine tool 330 may be, for example, a welding machine. The workpiece 200 may also be moved directly from the bending machine 100 to the machine tool 330.

The production controller 320 schedules the timing and order of operations and workpieces. The planning or a part relevant to the respective machine is transmitted to the machine tool 330 and the bending machine 100. For this purpose, the bending machine 100 contains an interface 340. The interface 340 is, for example, compatible with a bus system which, for reasons of clarity, is not shown here and connects the components of the machining line 300 to one another.

Via the interface 340, the bending machine 100 receives a time indication of subsequent further machining of the workpiece to be bent, for example in the machine tool 330. For each workpiece, the bending machine 100 then knows the time from the completed bending operation until the subsequent further machining. For example, this period may be from approximately thirty minutes to approximately two to three days.

Furthermore, the bending machine 100 obtains information about a time-dependent springback of the workpiece to be bent. This information can either be obtained via the interface 340 from the production controller 320 or from an internal database 350 as shown here. The database 350 may also be arranged in the production controller 320. The controller 130 of the bending machine 100 has an interface (not shown here) to the database 350.

From the two input quantities of information about a time-dependent springback and the time indication of a subsequent further machining, the controller 130 calculates the adapted bending angle $\alpha$. For this purpose, the bending angle $\beta$ to be bent for the bending operation is first determined from a bending plan or production plan. Then, an angular offset can subtract an immediate springback of the workpiece immediately after the bending operation. Finally, the overbending angle is subtracted so that the adapted bending angle $\alpha$ is obtained.

With this adapted bending angle $\alpha$, the workpiece 200 is then bent and then moved to the store 310. The store 310 is designed such that the springback of the workpiece is made possible until further machining. Correspondingly, in the subsequent machining in the machine tool 330, the workpiece 200 has exactly the bending angle $\beta$ to be bent so that automated further machining can be carried out successfully.

Figure 4:
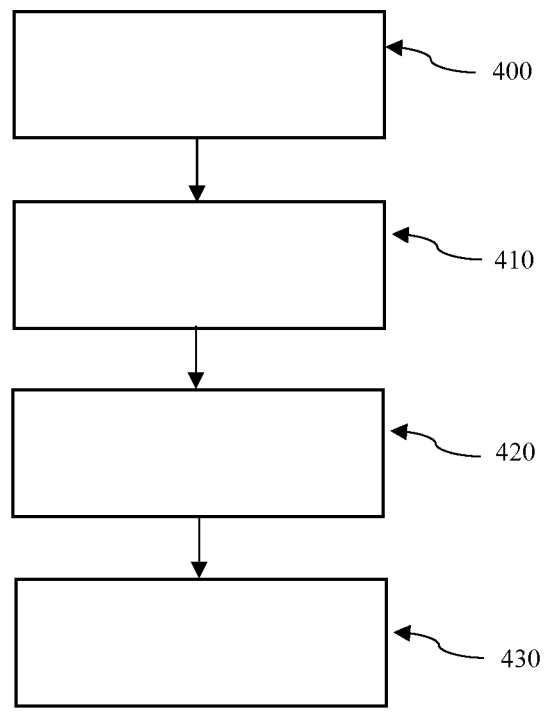
FIG. 4 shows a flow chart of a method for bending a metallic workpiece.

FIG. 4 shows a flow chart of a method for bending a metallic workpiece in a bending machine.

In a first step 400, information about a time-dependent springback of the workpiece to be bent is captured. This information was determined, for example, in test series and stored in a database. If necessary, interpolation calculations can be performed. The database contains information regarding the time-dependent springback as a function of at least one of the parameters of time, material, material thickness, bending speed, and machining already carried out. At least one of the parameters is known from the bending plan or the production plan.

In a second step 410, a time indication of subsequent further machining of the workpiece to be bent is captured. This time indication, such as a time or a duration between the bending operation and the further machining, can be taken from a production plan.

In a third step 420, an adapted bending angle is calculated based on the springback and the time indication. This can be, for example, a database query with the springback or at least one of the parameters and the time indication. The adapted bending angle can be calculated such that an immediate springback of the workpiece immediately after the bending operation and a future springback of the workpiece until the further machining are taken into account and also compensated.

In a fourth step 430, the workpiece is bent beyond a bending angle to be bent, up to the adapted bending angle such that the workpiece is sprung back to the bending angle to be bent at the time of the subsequent further machining.

The bending machine 100 or machining line 300 presented here allows an overbending of the workpiece, taking into account the time-dependent stress relief until the time of further machining. Thus, the exact bending angle is available even during subsequent further machining of the workpiece.

The invention claimed is:

1. A bending machine configured to bend a metallic workpiece, having a controller configured to control a bending operation,
    wherein the controller has at least one interface configured to obtain information about a time-dependent springback of the workpiece to be bent and to obtain a time indication of a subsequent further machining of the workpiece to be bent,
    wherein the controller is configured to calculate an adapted bending angle ($\alpha$) based on the springback and the time indication, and
    wherein the bending machine is configured to bend the bending operation beyond a bending angle ($\beta$) to be bent up to the adapted bending angle ($\alpha$),
    characterised in that the adapted bending angle ($\alpha$) is calculated such that an immediate springback of the workpiece immediately after the bending operation and a future springback of the workpiece during storing of the workpiece are taken into account until further machining.

2. The bending machine according to claim 1, characterised in that the bending machine comprises a database with information regarding the time-dependent springback depending on at least one of the parameters of time, material, material thickness, bending speed, and machining already carried out.

3. The bending machine according to claim 1, characterised in that the bending machine has a sensor configured to capture the bending angle ($\beta$) and in that the controller is configured by correction values captured by the sensor for the calculation of the adapted bending angle ($\alpha$) to use.

4. A machining line configured to machine a metallic workpiece with a bending machine according to claim 1, a downstream machine tool for further machining the workpiece, and a production controller, wherein the production controller has at least one interface, configured to transmit information about a time indication of subsequent further machining of the workpiece to be bent on the machine tool to an interface of the bending machine.

5. The machining line according to claim 4, characterised in that a store is provided for storage and springback of the workpiece until further machining in the machine tool is provided.

6. A method of bending a metallic workpiece in a bending machine, comprising the steps of:
    capturing information about a time-dependent springback of the workpiece to be bent;
    capturing a time indication of subsequent further machining of the workpiece to be bent;
    calculating an adapted bending angle ($\alpha$) based on the springback and the time indication; and
    bending the workpiece over a bending angle ($\beta$) to be bent to the adapted bending angle ($\alpha$),
    characterised in that the adapted bending angle ($\alpha$) is calculated such that an immediate springback of the workpiece immediately after the bending operation and a future springback of the workpiece during storing of the workpiece are taken into account until further machining.

7. The method according to claim 6, characterised in that, after the bending operation, the workpiece is stored in a store for storage and springback of the workpiece until further machining.

8. The method according to claim 6, characterised in that the calculation is performed in a controller of a bending machine.

9. The method according to claim 6, characterised in that a bending machine is in a machining line and that the calculation is performed in a production controller of the machining line.

* * * * *